Jan. 22, 1924.
J. A. ROBERTSON ET AL
1,481,272
EXPOSURE IDENTIFICATION CAMERA
Filed March 8, 1922  2 Sheets-Sheet 1
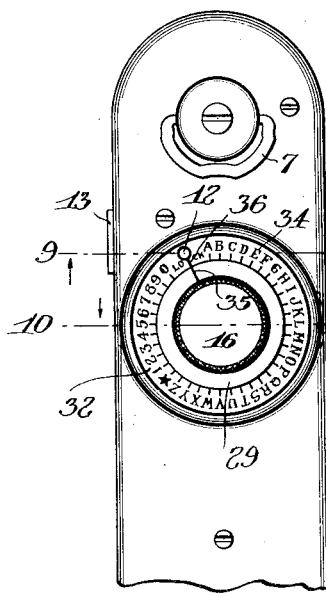
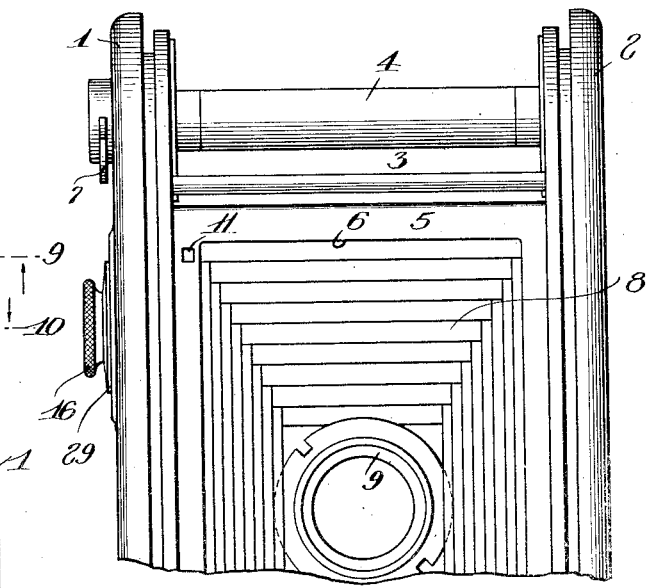
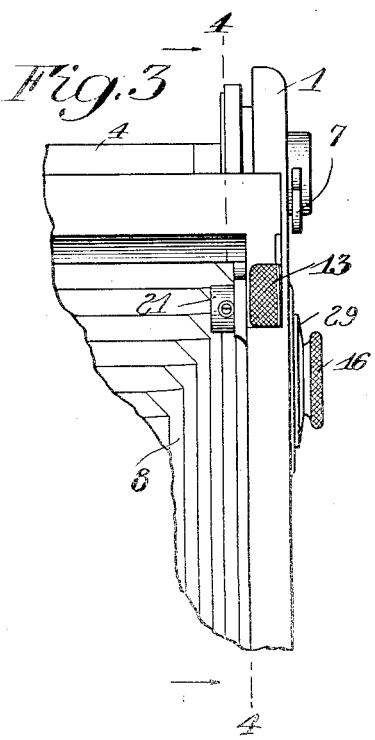
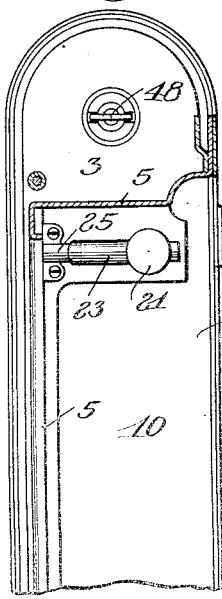
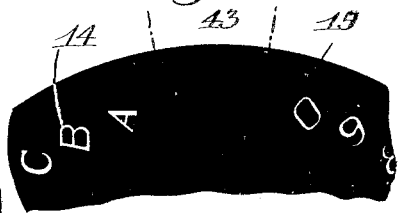
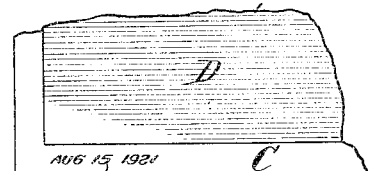
INVENTORS
John A. Robertson
Philip W. Tierney
BY Frederick S. Church
their ATTORNEY Jan. 22, 1924.                                              1,481,272
J. A. ROBERTSON ET AL
EXPOSURE IDENTIFICATION CAMERA
Filed March 8, 1922        2 Sheets-Sheet 2
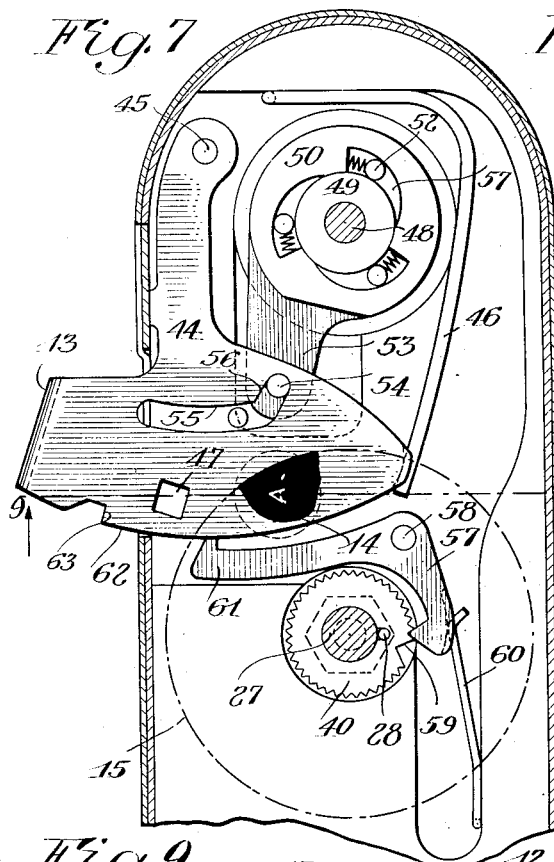
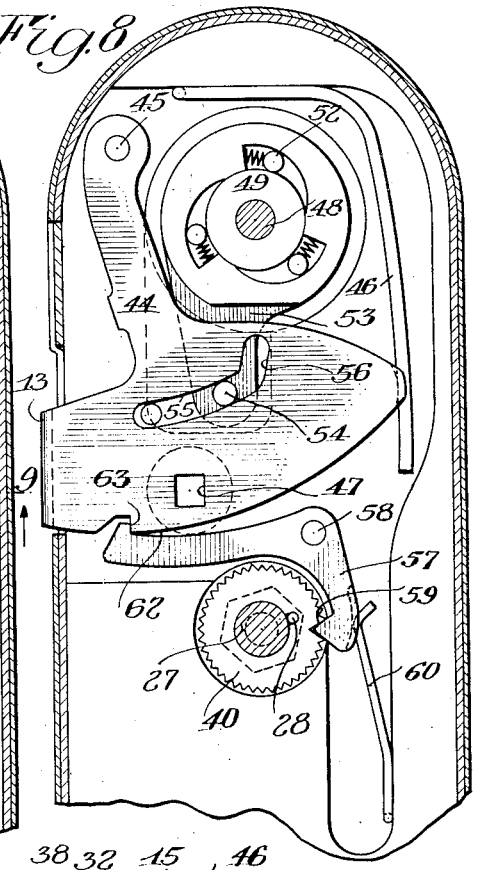
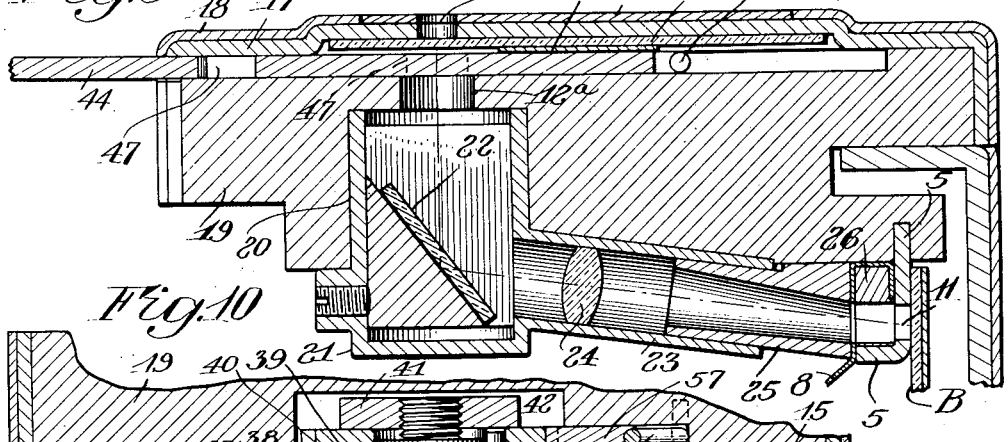
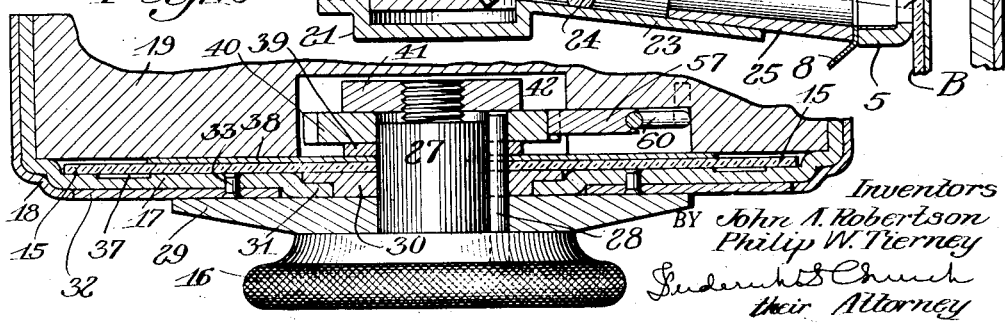
Inventors
John A. Robertson
Philip W. Tierney
BY
their Attorney Patented Jan. 22, 1924.

1,481,272

UNITED STATES PATENT OFFICE.

JOHN A. ROBERTSON AND PHILIP W. TIERNEY, OF ROCHESTER, NEW YORK, ASSIGNORS TO EASTMAN KODAK COMPANY, OF ROCHESTER, NEW YORK, A CORPORATION OF NEW YORK.

EXPOSURE-IDENTIFICATION CAMERA.

Application filed March 8, 1922. Serial No. 542,105.

*To all whom it may concern:*

Be it known that we, JOHN A. ROBERTSON and PHILIP W. TIERNEY, of Rochester, in the county of Monroe and State of New York, have invented certain new and useful Improvements in Exposure - Identification Cameras; and we do hereby declare the following to be a full, clear, and exact description of the same, reference being had to the accompanying drawings, forming a part of this specification, and to the reference numerals marked thereon.

Our present invention relates to photography, and more particularly to photographic cameras, and it has for its object to provide a simple, convenient and compact means for light printing identifying marks or characters on the film upon each exposure of a picture area thereof if such is the desire of the operator. The improvements are directed in part toward increasing the facility with which a series of characters may be selectively printed in succession; toward automatic feeding means whereby the film is advanced to space the imprints and toward arrangements whereby the shutter controlling the light admission opening is locked closed when the printing device is not in use. To these and other ends the invention resides in certain improvements and combinations of parts, all as will be hereinafter more fully described, the novel features being pointed out in the claims at the end of the specification.

In the drawings:

Figure 1 is a fragmentary side view of a folding camera provided with an exposure identification mechanism constructed in accordance with and illustrating one embodiment of our invention;

Figure 2 is a rear view of the camera with the back removed;

Figure 3 is a front view of a fragment of the camera in the region of the identification mechanism;

Figure 4 is a fragmentary section on the line 4—4 of Figure 3 showing an inner face of the camera wall in elevation;

Figure 5 is a fragmentary plan view of the printing stencil;

Figure 6 is a fragmentary view of a film or print showing the position of the markings made thereon;

Figure 7 is an enlarged fragmentary sectional view in the plane of a side wall of the camera showing the exposure identification shutter mechanism in elevation and in closed position;

Figure 8 is a similar view showing the shutter open and in locked position;

Figure 9 is a section, enlarged, on the line 9—9 of Figures 1 and 7, and

Figure 10 is an enlarged fragmentary section on the line 10—10 of Figure 1.

Similar reference numerals throughout the several views indicate the same parts.

We have illustrated our invention in the present instance in connection with a familiar type of folding camera because certain of its features are particularly applicable to folding cameras, and its compactness in general has been designed with that end in view. The side walls 1 and 2 only of the body of such a camera are shown in the drawings (the back being removed) and they comprise between them the usual film chamber 3 for a winding spool or roll 4 and a frame 5 in the focal plane, the opening 6 of which is the exposure opening of the camera and defines the field of exposure on the film that is drawn across the rear of the frame, the margins of the film strip travelling on the side pieces of the frame. The winding spool 4 may be rotated by hand as usual through the use of an exterior winding key 7. The bellows 8 with the lens mount 9 at its front end is attached at its rear end to the frame 5 and when collapsed occupies the bellows chamber 10 within the body in front of the frame.

To first give an idea of the general nature of the mechanism and its accomplishments, the frame 5 is provided on one of its sides with a small opening 11 (Figure 2) hereinafter called the printing opening, which, as will be seen is alined with the marginal portion of the film strip at one side of the exposure area and which is ordinarily masked by the frame. A beam of light is conveyed to this printing opening 11 from an opening 12 in the side of the camera body (Figure 1) hereinafter termed the light admission opening, under the control of a shutter operated by pressing an exteriorly arranged finger piece 13. There is selectively exposed in the opening 12 a number of characters such as those of the alphabet as indicated at 14 in Figure 5 on a stencil disk 15 rotated by means of an exteriorly arranged knob 16. The finger piece 13 is normally raised or projected as in Figure 7 but certain positions of the knob 16 and disk 15 have the effect of locking the finger piece 13 in the depressed or retracted position of Figures 1 and 8. Between successive prints from the stencil dial the film strip is automatically fed or wound a spacing distance through a connection from the shutter to the winding devices so that an inscription such as the date indicated at A in Figure 6 may be printed, the film being indicated at B and its otherwise blank margin at C in such figure, the picture area being shown at D.

We will first describe the manner in which the light is conducted from the admission opening 12 to the printing opening 11 without explaining at present the extent of the opening 12 or the parts through which it passes. Referring to Figure 9 the wall of the camera body comprises a metal skin 17 covered by the usual leather facing 18 and applied to a thicker inner wall 19 preferably of wood. This wall 19 is bored at 12$^a$ in alinement with opening 12 to form a continuation thereof and is counter-bored at 20 to receive a shell 21 containing an inclined mirror 22. A collar 23 forming a tubular extension on the shell contains a small lens 24 having one of its foci in the plane of the mirror and the other in the plane of the opening 11 of the frame 5. For convenience in assembling the tube 23 has a telescopic extension 25 that connects with the securing frame 26 for the bellows 8 on the front side of the frame 5, the general object being to make a light tight passage extending inwardly and rearwardly at the side of the bellows chamber. It will be seen that the parts can be easily assembled or applied from within the bellows chamber by which they are completely housed, and there is thus provided a very small projection apparatus that records an image presented at the opening 12 on the film margin at the rear of printing opening 11.

We will next describe means by which the characters on the stencil disk 15 (which may be generally opaque with translucent characters as shown or generally translucent with opaque characters) are presented to the openings 12. Referring to Figure 10 the knob 16 is mounted on a shaft 27 to which is fixed by a key 28 an indicator plate 29 just below the knob and a bearing hub 30. The latter has a bearing in a boss 31 of the metal wall piece 17 against which boss the bearing hub and indicator plate 29 interlock. The indicator plate also bears upon an annular dial plate 32 riveted or otherwise secured to the wall member 17 at 33 and lying flush with the leather covering 18. The dial plate as shown in Figure 1 is marked with a series of characters 34 (Figure 1) consisting in the present instance of an alphabet and the numerals, while the indicator plate 29 has a pointer thereon consisting in the present instance of a radial line 35 adapted to register with any one of the characters as the knob is rotated. There is also on the dial plate a mark entitled "lock" to which the indicator may be rotated for purposes hereinafter described, and this point may be opposite the light admission opening 12 as indicated at 36 in Figure 1. The light admission opening 12 extends through the dial plate and the camera wall 17 or rather the boss 31 thereof, and its extension through the wall member 19 has been previously described and indicated at 12$^a$.

Also fixed to the shaft 27 by the key 28 is the stencil dial 15 which lies next to the hub 30 and just beneath the metal wall member 17, which latter is annularly recessed at 37 so that it will not scrape the characters 14. Next to the dial 15 is a thin wear plate 38 against the wooden wall member 19 and beyond that a spacing washer 39, a ratchet wheel 40 and a cap nut 41, all except the last mentioned being locked by the key 28. The last mentioned parts are accommodated within a cavity 42 in the wall member 19. It will thus be seen that anyone of the characters on the stencil dial 15 can be brought into register with the light admission opening 12 and its presence there indicated by the register of the indicator 29—35 with the corresponding character on the index dial 32.

The stencil 15 is also provided with an opaque blank space indicated generally at 43 in Figure 5, and this space registers with and closes opening 12 when the indicator 35 points to "lock" on the index dial 32 in which position the light passage is sealed against the entrance of light.

We also provide a shutter device controlling the light admission opening 12, and referring to Figures 7 and 8 this is in the present form of a swinging shutter plate 44 pivoted at 45 to the body between the lower elements 17 and 19. This shutter plate carries the finger portion 13 previously described projecting to the exterior of the camera, which finger piece is held normally raised or projected by a spring 46 as in Figure 7. When the finger piece is depressed and the shutter member swung on its pivot, an opening 47 therein moves into register with the opening 12, as in Figure 8, and the character 14 on the stencil that is opposite the opening is photographed on the film. As the shutter moves into exposing position in this manner it moves the film a spacing distance by actuating the winding mechanism thereof.

The winding mechanism includes the spool 4 and a stud or center on and by which it is turned, said stud or center being suitably journaled in the camera wall and indicated at 48 in Figures 7 and 8. It is provided with a clutch hub 49 on the periphery of which is rotatably mounted a clutch element 50 having pockets 51 therein containing clutch balls or rollers 52 operating to grab the clutch hub 49 in one direction and release it in the other in a manner well known in this art. This clutch also prevents back wind on the part of the key 7. An arm 53 extends from the clutch element 50 and is provided with a pin 54 cooperating with a slot in the shutter member having an arcuate portion 55 and a laterally turned portion 56 at the end thereof. When the shutter is closed as in Figure 7, the pin 54 occupies the end 56 of the slot, and as the shutter is operated through the finger piece 13 it rocks the arm 53 and rotates the winding stud 48 a short distance to feed the film one space. The pin 54 however has a slip-off connection with the shutter and the arm 53 is moved only during the initial movement of the shutter, because as soon as the pin 54 reaches the arcuate portion 55 of the slot its motion is lost and the shutter completes its movement to the position of Figure 8 without further movement of the arm 53. When the shutter returns to the position of Figure 7 under the influence of its spring 46, it picks up the pin 54 and returns the arm 53, the clutch moving idly.

It will be understood, of course that when the shutter is in the position of Figure 8 in which it uncovers the opening 12 for printing purposes the camera is held with the opening 12 exposed to the sky or other clear source of light.

When the camera is not in use it is desirable to lock the shutter 44 in the retracted position of Figure 8. It is open in this position, yet it is also desirable to have the light cut off from opening 12. We therefore arrange to have opening 12 closed by the blank space 43 on the stencil plate or disk 15 at this time, and we provide for automatically locking the shutter in retracted position provided the opening is so closed. This function is performed by a device that also acts to center the characters 14 opposite the opening 12. It consists in the present instance of a centering pawl 57 pivoted at 58 and cooperating with the ratchet 40 on the shaft 27 which latter is provided with a number of teeth equal to the characters on the dials 15 and 32. The ratchet 40 is however also provided with a deeper recess 59 between two of the teeth, and when the pawl 57 reaches this recess into which it is urged by its tensioning spring 60 its throw is increased to such an extent that a locking arm 61 formed as an extension thereon may travel in contact with a concentric edge face 62 of the shutter member. As the shutter is opened by depressing the finger piece 13 the locking arm 61 finally snaps into engagement with the locking shoulder 63 on the shutter plate and locks it. This occurs however only when the knob 16 is rotated to a point at which the indicator 29—35 registers with "lock" on the index dial 32 and the blank portion 43 is opposite the opening 12 to seal it, for it is only in this position of the parts that the recess 49 in the ratchet 40 is in position to allow the centering pawl 57 sufficient throw, as in Figure 8, to permit the locking engagement.

We claim as our invention:

1. In a folding camera, the combination with a body having a bellows chamber provided with an opening through a side wall of the body, a bellows, and a frame forming an exposure opening at the rear of the bellows and chamber and provided in one of its sides with a marginal opening registering with the otherwise masked margin of a film or plate when in rear of the frame and exposure opening, of a projection device arranged within the bellows chamber for conducting light from the opening in the side wall of the body to the marginal opening in the frame.

2. In a folding camera, the combination with a body having a bellows chamber provided with an opening through a side wall of the body, a bellows and a frame forming an exposure opening at the rear of the bellows and chamber and provided in one of its sides with a marginal opening registering with the otherwise masked margin of a film or plate when in rear of the frame and exposure opening, of a projection device arranged within the bellows chamber for conducting light from the opening in the side wall of the body to the marginal opening in the frame, said device embodying a mirror and a lens having a focal point at the opening in the frame.

3. In a folding camera, the combination with a body having a bellows chamber provided with an opening through a side wall of the body, a bellows and a frame forming an exposure opening at the rear of the bellows and chamber and provided in one of its sides with a marginal opening registering with the otherwise masked margin of a film or plate when in rear of the frame and exposure opening, of a projection device arranged within the bellows chamber for conducting light from the opening in the side wall of the body to the marginal opening in the frame, said device embodying a shell embedded in the inner side of the side wall of the bellows chamber and containing a mirror and a lens for projecting an image from the mirror through the marginal opening in the frame.

4. In a photographic camera, the combination with a body having an opening in a side wall thereof and means for conducting a beam of light from said opening to a localized field of exposure at the margin of a sensitive element within the body, of a shaft in the side wall of the body provided with an exterior knob, a translucent stencil disk rotated by the shaft to traverse the opening, a dial and indicator on the wall and shaft, a ratchet on the latter and a centering pawl cooperating with the ratchet to register exact readings of the dial and indicator.

5. In a photographic camera, the combination with a body having an opening in a side wall thereof and means for conducting a beam of light from said opening to a localized field of exposure at the margin of a sensitive element within the body, of a shaft in the side wall of the body provided with an exterior knob, a translucent stencil disk rotated by the shaft to traverse the opening, a dial and indicator on the wall and shaft, a ratchet on the latter, a shutter for the opening and a centering pawl cooperating with the ratchet to register exact readings of the dial and indicator and adapted to lock the shutter.

6. In a photographic camera, the combination with a body having an opening in a side wall thereof and means for conducting a beam of light from said opening to a localized field of exposure at the margin of a sensitive element within the body, of a shaft in the side wall of the body provided with an exterior knob, a translucent stencil disk rotated by the shaft to traverse the opening, a dial and indicator on the wall and shaft, a ratchet on the latter having a depression therein, a shutter for the opening and a centering pawl cooperating with the ratchet and adapted to lock the shutter when said pawl cooperates with the depression in the ratchet.

7. In a photographic camera, the combination with a body having an opening in a side wall thereof and having a film chamber, a film winding device for said chamber, and means for conducting a beam of light from said opening to a localized field of exposure at the margin of a sensitive element within the body, of a shaft in the side wall of the body provided with an exterior knob, a translucent stencil disk rotated by the shaft to traverse the opening, a dial and indicator on the wall and shaft, a ratchet on the latter, a shutter for the opening, means actuated by the shutter for operating the film winding device with a step-by-step motion and a centering pawl cooperating with the ratchet and adapted to cooperate with the shutter to lock the same.

8. In a photographic camera, the combination with a camera body having a light opening, of an actinic exposure identification mechanism connected with the body to receive light through said opening and embodying a movable stencil traversing the latter, a shutter for the opening, and a centering device for the stencil having a position in which it is adapted to also lock the shutter.

9. In a photographic camera, the combination with a camera body having a light opening, of an actinic exposure identification mechanism connected with the body to receive light through said opening and embodying a movable stencil traversing the latter and provided with a portion adapted to register with and seal the light opening, a shutter for the latter and a device under the control of the stencil adapted to lock the shutter when the stencil is so sealing the light opening.

10. In a photographic camera, the combination with a camera body having a light opening and a film chamber provided with a winding device, of an actinic exposure identification mechanism connected with the body to receive light through said opening and embodying a stencil traversing the opening and having a portion adapted to register with and seal the same, means for actuating the winding device with a step by step movement, and locking means therefor under the control of the stencil.

11. In a photographic camera, the combination with a camera body having a light opening and a film chamber provided with a winding device, of an actinic exposure identification mechanism connected with the body to receive light through said opening and embodying a movable stencil, a shutter for the opening adapted to also actuate the winding device and a centering device for the stencil having a position in which it is adapted to lock the shutter.

12. In a photographic camera, the combination with a camera body having a light opening and a film chamber provided with a winding device, of an actinic exposure identification mechanism connected with the body to receive light through said opening and embodying a movable stencil, a shutter plate for the opening provided with a cam slot and a clutch for operating the winding device step-by-step in one direction and embodying an arm having a projection cooperating with the cam slot in the shutter plate to be actuated by the latter while in one portion of the slot and to constitute a lost motion connection with the shutter plate while in another portion of said slot.

13. In a photographic camera, the combination with a camera body having a light opening and a film chamber provided with a winding device, of an actinic exposure identification mechanism connected with the body to receive light through said opening and embodying a movable stencil, a shutter plate for the opening and a clutch for operating the winding device step-by-step in one direction and embodying an arm having a slip-off connection with the shutter for actuation thereby during a portion only of the shutter movement.

JOHN A. ROBERTSON.
PHILIP W. TIERNEY.